US011676599B2

(12) United States Patent
Eda et al.

(10) Patent No.: US 11,676,599 B2
(45) Date of Patent: Jun. 13, 2023

(54) OPERATIONAL COMMAND BOUNDARIES

(71) Applicant: INTERNATIONAL BUSINESS MACHINES CORPORATION, Armonk, NY (US)

(72) Inventors: Sasikanth Eda, Vijayawada (IN); Sarbajit K. Rakshit, Kolkata (IN); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/315,397

(22) Filed: May 10, 2021

(65) Prior Publication Data

US 2022/0358914 A1    Nov. 10, 2022

(51) Int. Cl.
*G10L 15/22* (2006.01)
*G10L 25/78* (2013.01)

(52) U.S. Cl.
CPC .............. *G10L 15/22* (2013.01); *G10L 25/78* (2013.01); *G10L 2015/223* (2013.01)

(58) Field of Classification Search
CPC ...................................................... G10L 15/22
See application file for complete search history.

(56) References Cited

U.S. PATENT DOCUMENTS

| 10,643,606 | B2  | 5/2020 | Piersol |           |
|------------|-----|--------|---------|-----------|
| 2014/0244267 | A1* | 8/2014 | Levi ........................ | G10L 15/22 |
|            |     |        |         | 704/275   |
| 2018/0047394 | A1* | 2/2018 | Tian ........................ | G10L 15/24 |
| 2019/0295540 | A1  | 9/2019 | Grima   |           |
| 2019/0342339 | A1  | 11/2019 | Nanda  |           |
| 2019/0362714 | A1  | 11/2019 | Mori   |           |
| 2019/0378503 | A1  | 12/2019 | Liu    |           |
| 2020/0020330 | A1  | 1/2020 | Guo    |           |
| 2020/0043489 | A1  | 2/2020 | Bradley |          |
| 2021/0056963 | A1  | 2/2021 | Lee    |           |

FOREIGN PATENT DOCUMENTS

| CN | 112368674 A | 2/2021 |
| WO | 2022238815 A1 | 11/2022 |

OTHER PUBLICATIONS

International Search Report and Written Opinion Authority, International Application No. PCT/IB2022/054100, International filing date: May 4, 2022, Completion of International search Aug. 11, 2022, International Search report dated Aug. 23, 2022, applicant file reference: P201908395PCT01, pp. 1-10.
Mell et al., "The NIST Definition of Cloud Computing", National Institute of Standards and Technology, Special Publication 800-145, Sep. 2011, pp. 1-7.

* cited by examiner

*Primary Examiner* — Ibrahim Siddo
(74) *Attorney, Agent, or Firm* — Tihon Poltavets

(57) ABSTRACT

A method for managing commands utilizing command boundaries includes establishing a first command boundary for a first intelligent virtual assistant operating on a first electronic device. The method also includes, responsive to receiving audio from a plurality of sources within a vicinity of the first electronic device, identifying a portion of the audio from the plurality of sources within the first command boundary. The method also includes, responsive to determining a command is identifiable in the portion of the audio from the plurality of sources within the first command boundary, sending the command to the first intelligent virtual assistant on the first electronic device.

25 Claims, 7 Drawing Sheets

OPERATIONAL COMMAND BOUNDARIES

BACKGROUND

This disclosure relates generally to intelligent virtual assistants, and in particular to establishing operational command boundaries for devices employing intelligent virtual assistants.

An intelligent virtual assistant (IVA) represents a software agent capable of performing various tasks for a user based on verbal commands or questions provided by the user, where the IVA operates on an electronic device. An Internet of Things (IoT) device is an example of an electronic device with an IVA, capable of connecting and exchanging data with other devices and systems via the internet to process any verbal commands or questions. The user providing the verbal commands or questions is typically located in a vicinity of the electronic device with the IVA, where a microphone on the electronic device can capture the verbal commands or questions. However, there are instances a surrounding environment of the user can include various interfering noises, such as irrelevant conversations between individuals, that can affect how the electronic device with the IVA captures the verbal commands or questions. The lack of distinction between near field sound versus far field sound affects how accurately the IVA captures the verbal command or question.

The surrounding environment of the user can also include multiple IVAs operating on multiple electronic devices, where a verbal command or question is capturable by more than one of the multiple IVAs sharing the surrounding environment. Presently, the user can identify a specific IVA operating on a specific electronic device in the shared environment to direct the command or question, but the user has to remember an identification word or phrase for the specific IVA operating on the specific electronic device. The identification word or phrase may not always be known to an individual unfamiliar with the surrounding environment and the multiple IVAs operating within. In some instances, an IVA can inadvertently receive a verbal command intended for another IVA within the surrounding environment due to a misidentification between the two IVAs by the user. Thus, potentially resulting in a security breach if the multiple IVAs are operating in an environment with multiple rooms, where a malicious individual can overhear sensitive information at the IVA that inadvertently received the verbal command. In additional to overhearing the sensitive information, the malicious individual can access sensitive information through the IVA via verbal commands or questions.

SUMMARY

Embodiments in accordance with the present invention disclose a method, computer program product and computer system for managing commands utilizing command boundaries, the method, computer program product and computer system can establish a near field radius for an intelligent virtual assistant operating on a first electronic device, wherein the near field radius is a command boundary that separates near field audio and far field audio. The method, computer program product and computer system can, responsive to receiving audio from a plurality of sources within a vicinity of the first electronic device, identify a portion of the audio from the plurality of sources within the near field radius. The method, computer program product and computer system can, responsive to determining a command is identifiable in the portion of the audio from the plurality of sources within the near field radius, instructing the intelligent virtual assistant to perform the command.

Embodiments in accordance with the present invention also disclose a method, computer program product and computer system for managing commands utilizing command boundaries, the method, computer program product and computer system can establish a first command boundary for a first intelligent virtual assistant operating on a first electronic device. The method, computer program product and computer system can, responsive to receiving audio from a plurality of sources within a vicinity of the first electronic device, identify a portion of the audio from the plurality of sources within the first command boundary. The method, computer program product and computer system can, responsive to determining a command is identifiable in the portion of the audio from the plurality of sources within the first command boundary, sending the command to the first intelligent virtual assistant on the first electronic device.

Embodiments in accordance with the present invention can establish a second command boundary for a second intelligent virtual assistant operating on a second electronic device, wherein the first command boundary does not overlap the second command boundary. Embodiments in accordance with the present invention can establish a first set of command rules for the first intelligent virtual assistant operating on the first electronic device and a second set of command rules for the second intelligent virtual assistant operating on the second electronic device.

Embodiments in accordance with the present invention can analyze the command for personal information. Responsive to determining the command relates to personal information, embodiments in accordance with the present invention can send an instruction to the first intelligent virtual assistant on the first electronic device based on a personal information command boundary for the command. Embodiments in accordance with the present invention can categorize the command performable by the first intelligent virtual assistant on the first electronic device. Responsive to determining based on the categorization the command relates to personal information, embodiments in accordance with the present invention can query the user to establish the personal information command boundary for the command, where a volume level response for the first intelligent virtual assistant on the first electronic device is associated with the personal information command boundary.

Embodiments in accordance with the present invention can categorize the command relating to personal information and a second portion of the command relating to personal information and categorize the command as including personal information or resulting in an audible response with personal information by the first intelligent virtual assistant on the first electronic device. Embodiments in accordance with the present invention can determine the command relates to personal information since the first portion of the command is categorized as having personal information and the command results in the audible response with personal information by the first intelligent virtual assistant on the first electronic device.

DETAILED DESCRIPTION

Figure 1:
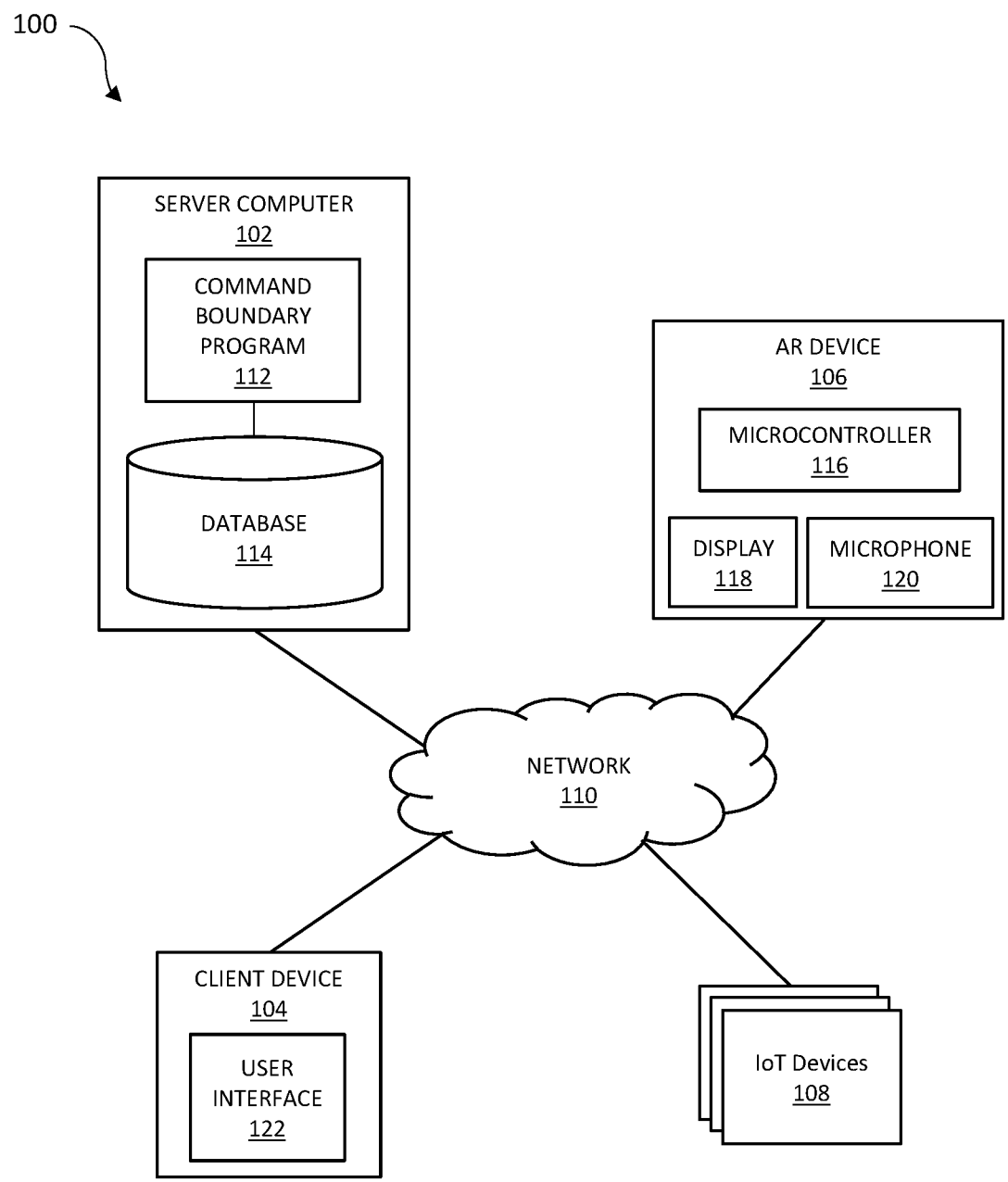
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, augmented reality (AR) device 106, and Internet of Things (IoT) devices 108 all interconnected over network 110. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, AR device 106, IoT devices 108, and other computing devices (not shown) within the distributed data processing environment via network 110. In another embodiment, server computer 102 represents a computing system utilizing clustered computers and components (e.g., database server computers, application server computers, etc.) that act as a single pool of seamless resources when accessed within the distributed data processing environment. Server computer 102 includes command boundary program 112 and database 114. Server computer 102 may include internal and external hardware components, as depicted and described in further detail with respect to FIG. 5.

Client device 104 can be a laptop computer, a tablet computer, a smart phone, smart watch, a smart speaker, or any programmable electronic device capable of communicating with various components and devices within the distributed data processing environment (e.g., server computer 102, AR device 106, and IoT devices 108), via network 110. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes an instance of user interface 122 for interacting with command boundary program 112 on server computer 102.

AR device 106 represents a user wearable augment reality device (e.g., electronic contact lens, wearable electronic headset) with integrated microcircuitry capable of displaying content to the user. AR device 106 includes microcontroller 116, display 118, and microphone 120, where command boundary program 112 can receive a verbal command or question from a user wearing AR device 106 for execution by one or more IoT device 108. Microcontroller 116 can include a display control circuit for display 118, a communication and power conversion circuit for communicating via network 110 and managing an integrated power supply, and a sensor readout and control circuit for monitoring eye movement of the user wearing AR device 106. Display 118 allows for a user of AR device 106 to view various notifications and queries from command boundary program 112. In an example where AR device 106 is an electronic contact lens, display 118 is a semitransparent display and microlens array integrated into AR device 106 for viewing content. AR device 106 can also include a power storage module, a solar cell module for charging the power storage module, a biosensor module for collecting data (e.g., tracking eye movement), and a communications and power module for communicating with server computer 102, client device 104, and IoT devices 108 via network 110. Microphone 120 captures verbal commands or questions directed to IoT devices 108, where microcontroller 116 transmits the captured verbal commands or questions to command boundary program 112 on server computer 102.

IoT devices 108 represent an electronic device connected to network 110 capable of receiving and executing a voice command provided by a user of client device 104 and/or AR device 106. Each IoT device 108 includes an instance of an intelligent virtual assistant (IVA) representing a software agent capable of performing various tasks for a user based on commands or questions provided by the user. IoT devices 108 can include but not limited to appliances, home security systems, health monitoring devices, factory equipment, wireless inventory trackers, biometric security scanners, and any other electronic device embedded with sensors and software for connecting and exchanging data with other devices and systems over the internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, AR device 106, IoT devices 108, and other computing devices (not shown) within the distributed data processing environment.

Command boundary program 112 can manage verbal commands directed to IoT devices 108 operating in a shared environment utilizing command boundaries and allows an administrative user of command boundary program 112 to consent to one or more features described herein to ensure the privacy of the administrative user is maintained. Command boundary program 112 manages verbal commands directed to IoT devices 108 by establishing a near field radius for each IoT device 108. Command boundary program 112 receives audio from multiple sources within a vicinity of IoT device 108 and identifies audio from the multiple sources within the near field radius of IoT device 108. Command boundary program 112 analyzes the identified audio from the multiple sources within the near field radius of IoT device 108 for a command performable by IoT device 108. If command boundary program 112 determines the identified audio does not include an identifiable command, command boundary program 112 notifies the user the command is unidentifiable via client device 104, AR device 106, and/or IoT device 108. If command boundary program 112 determines the identified audio includes an identifiable command, command boundary program 112 determines whether an AR device (e.g., AR device 106) is associated with the command. If command boundary program 112 determines an AR device is not associated with the command, command boundary program 112 instructs IoT device 108 to perform the command. If command boundary program 112 determines an AR device is associated with the command (i.e., AR device 106), command boundary program 112 displays the identified command in AR device 106, where the user associated with AR device 106 can perform corrections to the identified command. If command boundary program 112 determines no corrections were received to the identified command, command boundary program 112 instructs IoT device 108 to perform the command. If command boundary program 112 determines corrections were received to the identified command, command boundary program 112 instructs IoT device 108 to perform the corrected command.

Command boundary program 112 can also manage verbal commands directed to IoT devices 108 operating in a shared environment utilizing command boundaries by establishing operational command boundaries for each IoT device 108. Command boundary program 112 identifies multiple IoT devices 108 within a defined area and establishes operational command boundaries for each of the multiple IoT devices 108 to reduce a likelihood of an unintended IoT device 108 inadvertently capturing a verbal command or question provided by a user. Command boundary program 112 further establishes command rules for each of the multiple IoT devices 108 to ensure security integrity is maintained if an unauthorized user is attempting to extract information via the multiple IoT devices 108. Command boundary program 112 receives audio with a command performable by at least one of the multiple IoT devices 108 and analyzes the audio command for personal information. Command boundary program 112 identifies a distance for an audio source associated with the audio command relative to each of the multiple IoT devices 108.

If command boundary program 112 determines the audio source is not within a command boundary of a specific IoT device 108, command boundary program 112 ignores the audio with the command. If command boundary program 112 determines the audio source is within a command boundary of a specific IoT device 108, command boundary program 112 determines whether audio source command rules are met. If command boundary program 112 determines the audio source command rules are not met, command boundary program 112 ignores the audio with the command. If command boundary program 112 determines the audio source command rules are met, command boundary program 112 determines whether command detection is disabled. If command boundary program 112 determines command detection is disabled, command boundary program 112 ignores the audio with the command. If command boundary program 112 determines command detection is enabled, command boundary program 112 sends the command to the appropriate IoT device 108.

Command boundary program 112 analyzes the command for personal information by categorizing the command performable by IoT device 108 and determining whether the command relates to personal information. If command boundary program 112 determines the command does not relate to personal information, command boundary program 112 identifies the distance for the audio source relative to each of the multiple IoT devices 108. If command boundary program 112 determines the command relates to personal information, command boundary program 112 queries the user to establish personal information command boundary for the command performable by the multiple IoT devices 108. Command boundary program 112 receives and stores the personal information command boundary for the command performable by the multiple IoT devices 108.

Database 114 is a repository that stores various data including floorplans (e.g., private residence, manufacturing floor, warehouse floor), near field radius boundary for each IoT device 108, operational command boundary for each IoT device 108, audio source command rules for each IoT device 108, personal information command boundaries for each IoT device 108, and any other data that command boundary program 112 utilizes for managing verbal commands directed to IoT devices 108. In the depicted embodiment, database 114 resides on server computer 102. In another embodiment, database 114 may reside on client device 104 or elsewhere within the distributed data processing environment provided command boundary program 112 has access to database 114. A database is an organized collection of data, where database 114 can be implemented with any type of storage device capable of storing data and configuration files that can be accessed and utilized by command boundary program 112, such as a database server, a hard disk drive, or a flash memory.

User interface 122 enables a user to make requests of or issue commands to server computer 102, client device 104, AR device 106, and IoT devices 108 via network 110. User interface 122 also enables the user to receive information and instructions in response on client device 104 via network 110. In one embodiment, a user of client device 104 accesses user interface 122 via voice commands in natural language. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 enables a user of client device 104 to interact with command boundary program 112 operating on server computer 102.

Figure 2:
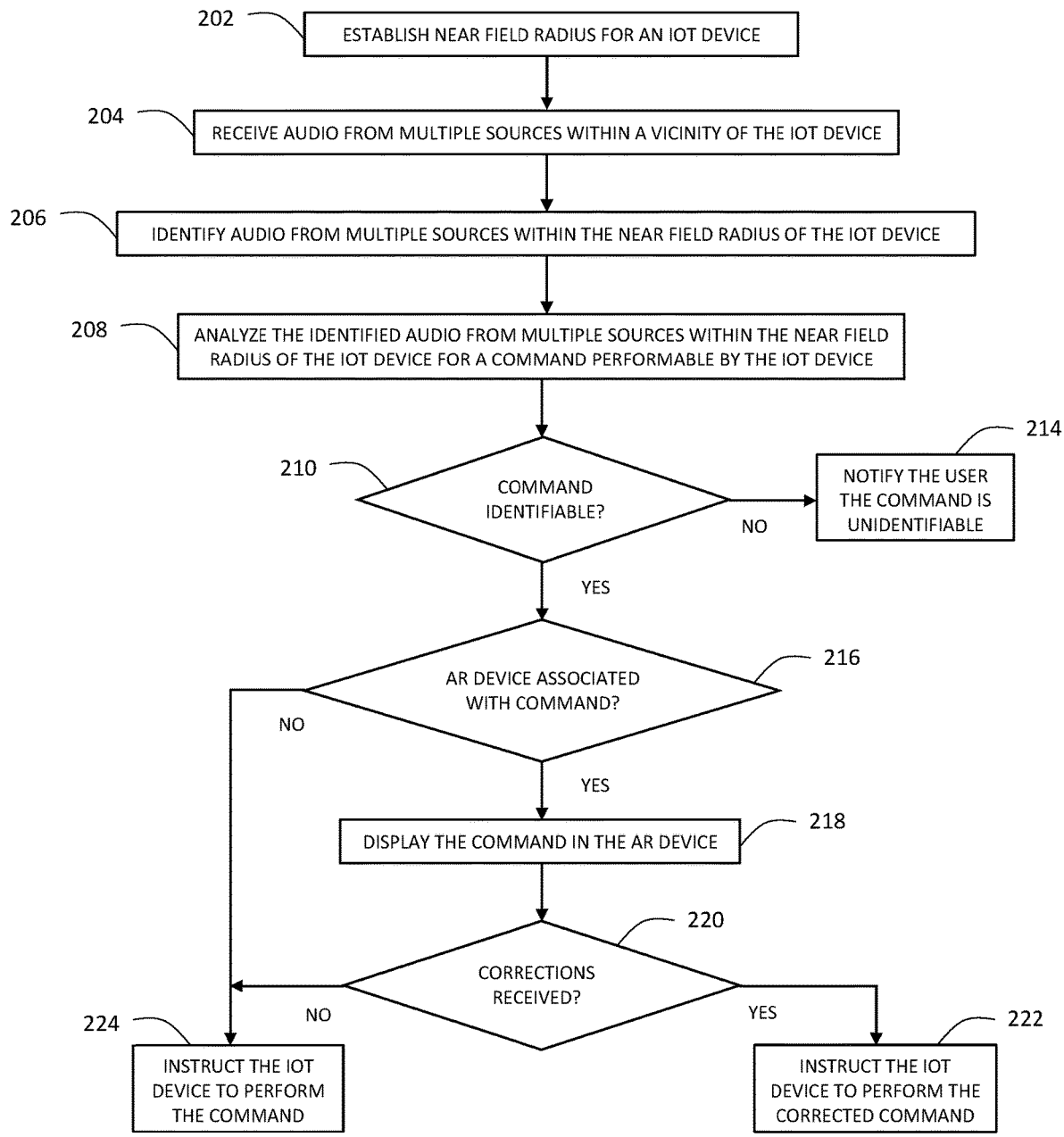
FIG. 2 depicts a flowchart for a command boundary program for managing intelligent virtual assistant commands utilizing a near field command boundary, in accordance with an embodiment of the present invention.

FIG. 2 depicts a flowchart for a command boundary program for managing intelligent virtual assistant commands utilizing a near field command boundary, in accordance with an embodiment of the present invention.

Command boundary program 112 establishes near field radius for an IoT device (202). Command boundary program 112 can differentiate between near field audio and far field audio, where command boundary program 112 processes voice commands received within the near field audio radius when identifying a command performable by an IoT device. Command boundary program 112 can establish the near field radius for the IoT device by querying an administrative user through an associated client device and/or AR device. Alternatively, command boundary program 112 can utilize a pre-determined radius (i.e., boundary) that separates the near field audio and the far field audio, where audio captured within the bounds of the pre-determined radius is near field audio and audio captured outside the bounds of the pre-determined radius is far field audio. For establishing the near field radius by querying the administrative user, command boundary program 112 can send a request to a client device and/or AR device associated with the administrative user to input a radius (e.g., 10 feet) that separates the near field audio and the far field radio. When inputting the near field radius utilizing an AR device, command boundary program 112 can train the IoT device by instructing the user to provide sample commands along a desired field radius to establish the near field radius for the IoT device. Command boundary program 112 can utilize the sample commands provided during the training of the IoT device to compare future commands received by the IoT device and identify which of the future commands are located within the near field radius of the IoT device.

Command boundary program 112 receives audio from multiple sources within a vicinity of the IoT device (204). Subsequent to establishing the near field radius for the IoT device, a microphone on the IoT device captures a wake word, also referred to as a trigger word, for activating an IoT device to capture audio within the vicinity. The IoT device can capture audio for a predetermined duration (e.g., 30 seconds) or for a duration where audio levels (e.g., decibel readings) are above a pre-determined threshold. The audio captured by the IoT device can be from multiple sources within the vicinity, where the multiple sources can include various individuals engaging in multiple conversations and any ambient noises (e.g., construction, music, vehicles) that might be present in the surrounding environment. The IoT device captures the audio from the multiple sources within the vicinity and sends the captured audio to command boundary program 112.

Command boundary program 112 identifies audio from multiple sources within the near field radius of the IoT device (206). Command boundary program 112 parses through the received audio from the multiple sources and eliminates any ambient noises from the surrounding environment that might have been captured by the IoT device through signal processing. Subsequently, command boundary program 112 identifies near field audio and far field audio by leveraging audio levels (e.g., average decibel readings), acoustic clues (e.g., sound frequency), and sharpness of the speech (e.g., decibel reading peaks). In some embodiments, command boundary program 112 is able to leverage data received from AR devices located in the vicinity of the IoT device to identify audio located within the bounds of the near field radius. For example, command boundary program 112 can identify AR devices operating within the vicinity of the IoT device when each of the AR devices connects to a local network shared with the IoT device. Command boundary program 112 utilizes location information for the identified AR devices to determine whether or not any of the AR devices are located within the near field radius of the IoT device. Furthermore, command boundary program 112 can query a portion of the AR devices located within the near field radius of the IoT device to determine whether a microphone for each of the portion of AR devices captured the audio that command boundary program 112 previously received in (204).

Command boundary program 112 analyzes the identified audio from the multiple sources within the near field radius of the IoT device for a command performable by the IoT device (208). Command boundary program 112 parses through the identified audio within the near field radius of the IoT device and identifies a command performable by the IoT device, where the command can be a question or an instruction for the IoT device to perform an action. Command boundary program 112 utilizes natural language processing (NLP) to identify the command performable by the IoT device. Command boundary program 112 determines whether the command is identifiable (decision 210). In the event command boundary program 112 determines the command is unidentifiable ("no" branch, decision 214), Command boundary program 112 notifies the user the command is unidentifiable (214). In the event command boundary program 112 determines the command is identifiable ("yes" branch, decision 214), command boundary program 112 determines whether an AR device is associated with the command (decision 216).

Command boundary program 112 notifies the user the command is unidentifiable (214). In this embodiment, command boundary program 112 instructs the IoT device to respond with an audible response that the command is unidentifiable. Command boundary program 112 can also provide one or more recommendations in the audible response to assist individuals with providing identifiable commands. In one example, command boundary program 112 provides a recommendation instructing an individual to relocate closer to the IoT device prior to providing a wake word and command combination. In another example, command boundary program 112 provides a recommendation instructing an individual to expand the near field radius for the IoT radius. In another embodiment, command boundary program 112 notifies the user the command is unidentifiable by sending a notification to a client device and/or AR device associated with audio in the near field radius of the IoT device.

Command boundary program 112 determines whether an AR device is associated with the command (decision 216). As previously discussed, command boundary program 112 can leveraged data received from AR devices located in the vicinity of the IoT device to identify audio located within the bounds of the near field radius. In the event command boundary program 112 determines an AR device is associated with the command ("yes" branch, decision 216), command boundary program 112 displays the command in the AR device (218). In the event command boundary program 112 determines an AR device is not associated with the command ("no" branch, decision 216), command boundary program 112 instructs the IoT device to perform the command.

Command boundary program 112 displays the command in the AR device (218). Command boundary program 112 displays the command directed to the IoT device in the AR device associated with the command to allow for the user to provide corrections to the command and any sub-command.

In one embodiment, command boundary program 112 previously identified a command by concatenating words with a wake word or phrase for the IoT device. Command boundary program 112 displays the command in portions (i.e., sub-commands) with visual indicators in the AR device. A first unique indicator (i.e., color, font, highlight) for a sub-command can present a current command for which the IoT device is to perform and a second unique indicator for another sub-command in queue for which the IoT device is to subsequently perform. Command boundary program 112 allows for the user to correct each sub-command and allows for the user to correct an order in which the IoT device is to perform each sub-command of the identified command.

In one example, command boundary program 112 identifies a command from an individual with an associated AR device located within the near field radius of an IoT device that states, "AB, turn off living room lights and turn on hallway lights". Command boundary program 112 displays the identified command in the AR device associated with the command, where a first indicator highlights "AB" as a wake word, a second indicator highlights "turn off living room lights" as a first sub-command, and a third indicator highlights "turn on hallway lights" as a second sub-command. Alternatively, command boundary program 112 displays the identified command in the AR device associated with the command, where a first indicator (e.g., green font color) highlights "turn off living room lights" as a first sub-command and a second indicator (e.g., red font color) highlights "turn on hallway lights" as a second sub-command, where the first sub-command is to be performed by the IoT device prior to the second sub-command. Command boundary program 112 allows for the user to correct an order of which sub-command the IoT device performs by altering the indicator of the first sub-command command and the second sub-command. As a result of the correction, the first indicator highlights "turn on hallway lights" as the first sub-command and the second indicator highlight ""turn off living room lights". Command boundary program 112 can accept any corrections to the sub-commands via audible instructions provided by the user of the AR device associated with the identified command. Alternatively, command boundary program 112 can accept any correction to the sub-commands via physical inputs on a client device (e.g., mobile phone) paired to the AR device associated with the identified command.

In another example, command boundary program 112 identifies a command from an individual with an associated AR device located within the near field radius of an IoT device that states, "AB, set an alarm . . . and remind me at noon to contact my manager". Command boundary program 112 displays the identified command in the AR device with a first indicator highlighting "remind me at noon to contact my manager" as a first sub-command. However, command boundary program 112 was not able to entirely capture a second sub-command of "set an alarm . . . " and by displaying the identified command in the AR device, the user can correct the command to include any missing portions of the second sub-command. Command boundary program 112 can accept a correction to the second sub-command by repeating the second sub-command in its entirety (e.g., "set an alarm for 11:55 am") and assigning a second indicator to the second sub-command. Command boundary program 112 allows for the user to subsequently alter an order of the first sub-command and the second sub-command of the identified command.

Command boundary program 112 determines whether a correction was received for the command (decision 220). In the event command boundary program 112 determines a correction was received ("yes" branch, decision 220), command boundary program 112 instructs the IoT device to perform the corrected command (222). In the event command boundary program 112 determines no correction was received ("no" branch, decision 220), command boundary program 112 instructs the IoT device to perform the command (224).

Figure 3:
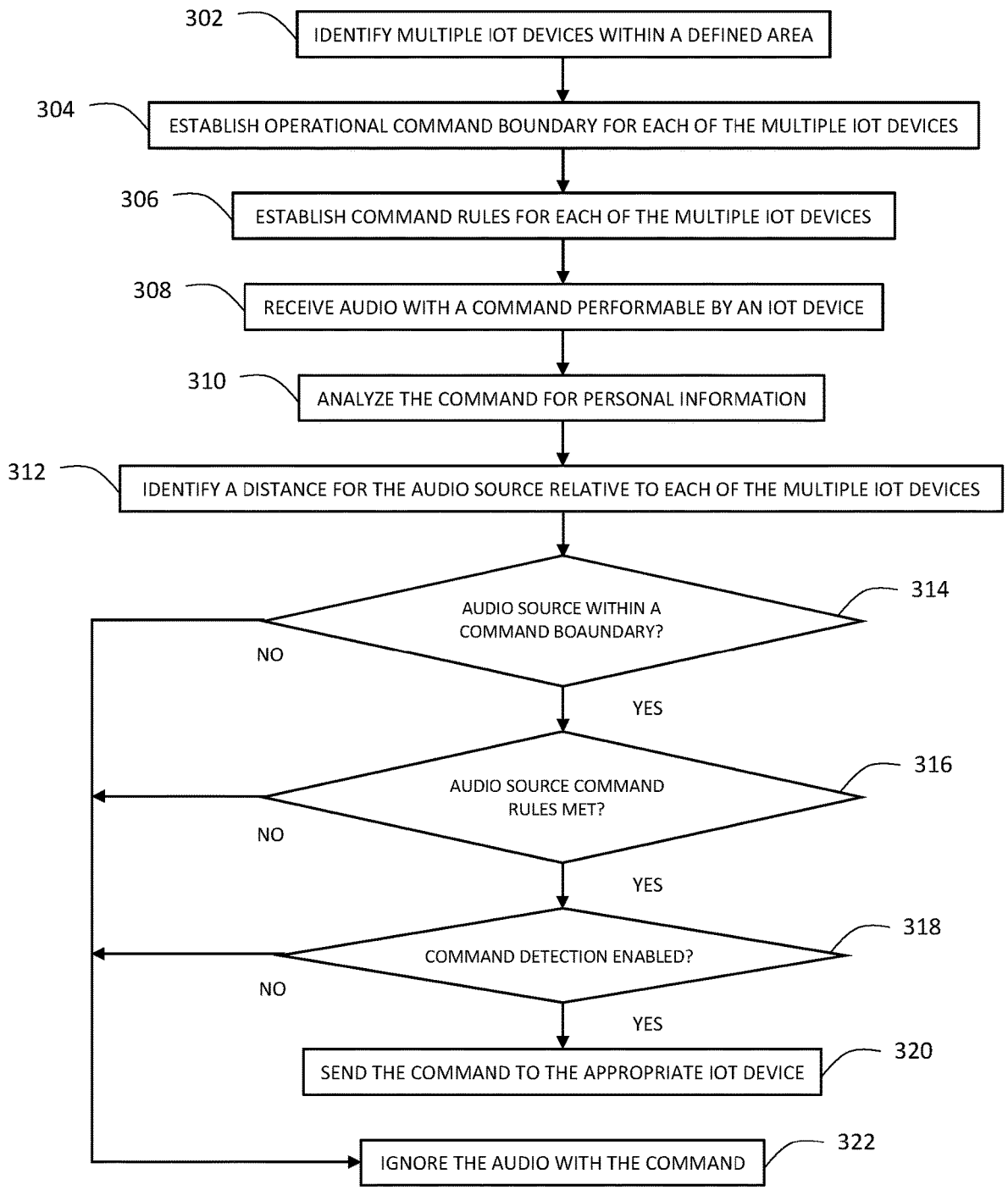
FIG. 3 depicts a flowchart for a command boundary program managing intelligent virtual assistant commands utilizing command boundaries for multiple intelligent virtual assistants operating in a shared environment, in accordance with an embodiment of the present invention.

FIG. 3 depicts a flowchart for a command boundary program managing intelligent virtual assistant commands utilizing command boundaries for multiple intelligent virtual assistants operating in a shared environment, in accordance with an embodiment of the present invention.

Command boundary program 112 identifies multiple IoT devices within a defined area (302). Command boundary program 112 identifies the multiple IoT devices within a defined area as each IoT device connects to a local network. In one example, multiple IVAs operating on multiple IoT devices are connected to a local network in a personal residence and command boundary program 112 identifies each of the multiple IoT devices as they connect to the local network in the personal residence. In another example, multiple IVAs operating on multiple IoT devices are connected to a local network in an office setting and command boundary program 112 identifies each of the multiple IoT devices as they connect to the local network in the office setting. Command boundary program 112 has the ability to instruct each of the multiple IoT devices to perform an audio capture test to determine whether an IoT device from the multiple IoT devices can capture audible commands. For example, command boundary program 112 instructs a first IoT device connected to the local network to produce unique audio at a determined frequency, where the remaining IoT device are instructed to listen for the unique audio at the determined frequency. If the unique audio is captured by at least one IoT device from the remaining IoT devices, command boundary program 112 determines that the IoT device producing the unique audio and the at least one IoT device that captured the unique audio share an operational command area. The operational command area represents an area where a user produced audible command is capturable by an IoT device and in this case, capturable by at least two IoT device. Command boundary program 112 can perform the audio capture test for each IoT device to determine which command boundaries of the multiple IoT devices overlap with one another.

Command boundary program 112 establishes operational command boundary for each of the multiple IoT devices (304). In this embodiment, command boundary program 112 queries an administrative user to establish an operational command boundary for each of the multiple IoT devices. The administrative user has the ability to establish each operational command boundary as a radius (e.g., 10 feet) surrounding each of the multiple IoT devices. Command boundary program 112 can receive the operational command boundaries for each of the multiple IoT devices via a user input or verbal command on an AR device or client device associated with the administrative user. In another embodiment, command boundary program 112 establishes an operational command boundary for each of the multiple IoT devices based on an additional audio capture test performed on the multiple IoT devices. Command boundary program 112 can instruct each IoT device to produce a unique audio at various volume levels to determine which of the remaining IoT devices from the multiple IoT devices capture the unique audio at the various volume levels. For example, a first IoT device produces a unique audio at five various audio levels, where a second IoT device captures the unique audio at the highest volume of the five various audio levels. Command boundary program 112 utilizes pre-determined audio capture distances for each of the five various audio level to determine a distance between the first IoT device and the second IoT device based on the second IoT device capturing the unique audio at the highest volume produced by the first IoT device. Based on the pre-determined distance, command boundary program 112 establishes an operational command boundary for the first IoT device, where a radius of the operation command boundary for the first IoT device is less than the pre-determined distance for the unique audio captured at the highest volume. Command boundary program 112 performs the unique audio at the various volume levels for each of the multiple devices to establish each of the operational command boundaries.

Command boundary program 112 establishes command rules for each of the multiple IoT devices (306). Command boundary program 112 can establish command rules for each of the multiple IoT devices based on user provided constraints. Alternatively, command boundary program 112 has the ability to learn command patterns for each IoT device and establish command rules for each IoT device based on learned command patterns. In one example, the command rules indicate which individuals can interact with each IAV operating on each IoT device based one or more of established vocal patterns of the user and/or one or more devices (e.g., client device, AR device) associated with a user providing the command. In another example, the command rules indicate whether a user can provide a command to an IoT device if the user is located outside of an operational command boundary. If the user is located outside of the operational command boundary of an IoT device and is providing a command to the IoT device via an intermediary device (e.g., client device, AR device), command boundary program 112 can ignore the command for security reasons. If the user is located within the operational command boundary of an IoT device and is providing a command to the IoT device via an intermediary device (e.g., client device, AR device), command boundary program 112 accepts the command.

Command boundary program 112 receives audio with a command performable by an IoT device (308). Command boundary program 112 receives the audio with the command performable by the IoT device from one of the multiple IoT devices operating in the shared environment. Command boundary program 112 analyzes the command for personal information (310). Command boundary program 112 analyzes the received audio with the command for personal information to determine if an action is required to ensure security integrity. The analyzing of the command for personal information by command boundary program 112 is discusses in further detail with regards to FIG. 4.

Command boundary program 112 identifies a distance for the audio source relative to each of the multiple IoT devices (312). In one embodiment, command boundary program 112 has the ability to utilize captured audio levels for the multiple IoT devices at the time the audio with the command was received to determine a distance of the audio source relative to each of the multiple IoT devices. Command boundary program 112 can also compare the audio levels for the multiple IoT devices at the time the audio with the command was received to the results of the additional audio capture test performed on the multiple IoT devices at the various volume levels in (304). In another embodiment, command boundary program 112 determines the received audio with the command is associated with an AR device and command boundary program 112 queries the AR device for location information. Command boundary program 112 utilizes the received location information for the AR device and a known location for each of the multiple IoT devices in the shared environment to identify a distance for the audio source relative to each of the multiple IoT devices.

Command boundary program 112 determines whether an audio source is located within a command boundary of an IoT device (decision 314). In the event command boundary program 112 determines the audio source is located within the command boundary of an IoT device ("yes" branch, decision 314), command boundary program 112 determines whether the audio source command rules are met (decision 316). In the event command boundary program 112 determines the audio source is not located within the command boundary of an IoT device ("no" branch, decision 314), command boundary program 112 ignores the audio with the command (322). Even though at least one IoT device from the multiple IoT devices was able to capture the audio with the command, command boundary program 112 ignores the audio with the command since the audio source was located outside of the operational boundaries of the multiple IoT devices.

Command boundary program 112 determines whether the audio source command rules are met (decision 316). In the event command boundary program 112 determines the audio source command rules are met ("yes" branch, decision 316), command boundary program 112 determines whether command detection is enabled (decision 318). In the event command boundary program 112 determines the audio source command rules are not met ("no" branch, decision 316), command boundary program 112 ignores the audio with the command (322).

Command boundary program 112 determines whether command detection is enabled (decision 318). Command boundary program 112 allows for an administrative user to temporary disable command detection for the multiple IoT device, where a wake word for the multiple IoT devices is temporarily disabled (e.g., one hour). In the event command boundary program 112 determines command detection is enabled ("yes" branch, decision 318), command boundary program 112 sends the command to an appropriate IoT device (320). In the event command boundary program 112 determines command detection is not enabled ("no" branch, decision 318), command boundary program 112 ignores the audio with the command (322).

Command boundary program 112 sends the command to the appropriate IoT device (320). In this embodiment, command boundary program 112 sends the command and an instruction for an action to ensure security integrity to the appropriate IoT device, if the command relates to personal information. The appropriate IoT device represents the previously identified IoT device from that multiple IoT devices that includes the audio source located within a corresponding command boundary. In one example, the instruction can include the IVA operating on the appropriate IoT device utilizing a specific volume level when responding to the command relating to personal information, where the specific volume level is lower than an operational volume level previously established by the user. The specific volume level for the audible response by the IVA on the IoT device is associated with a personal information command boundary for the IoT device, where the personal information command boundary ensures the volume level of the response is low enough that an individual outside of the personal information command boundary cannot hear the audible response by the IVA on the IoT device. In another example, the instruction can include the IVA operating on the appropriate IoT device sending a textual response to a client device and/or AR device associated with the administrative user. In yet another example, the instruction can include the IVA operating on the appropriate IoT device sending a textual response to a client device and/or AR device associated with the received audio with the command performable by the IoT device.

Figure 4:
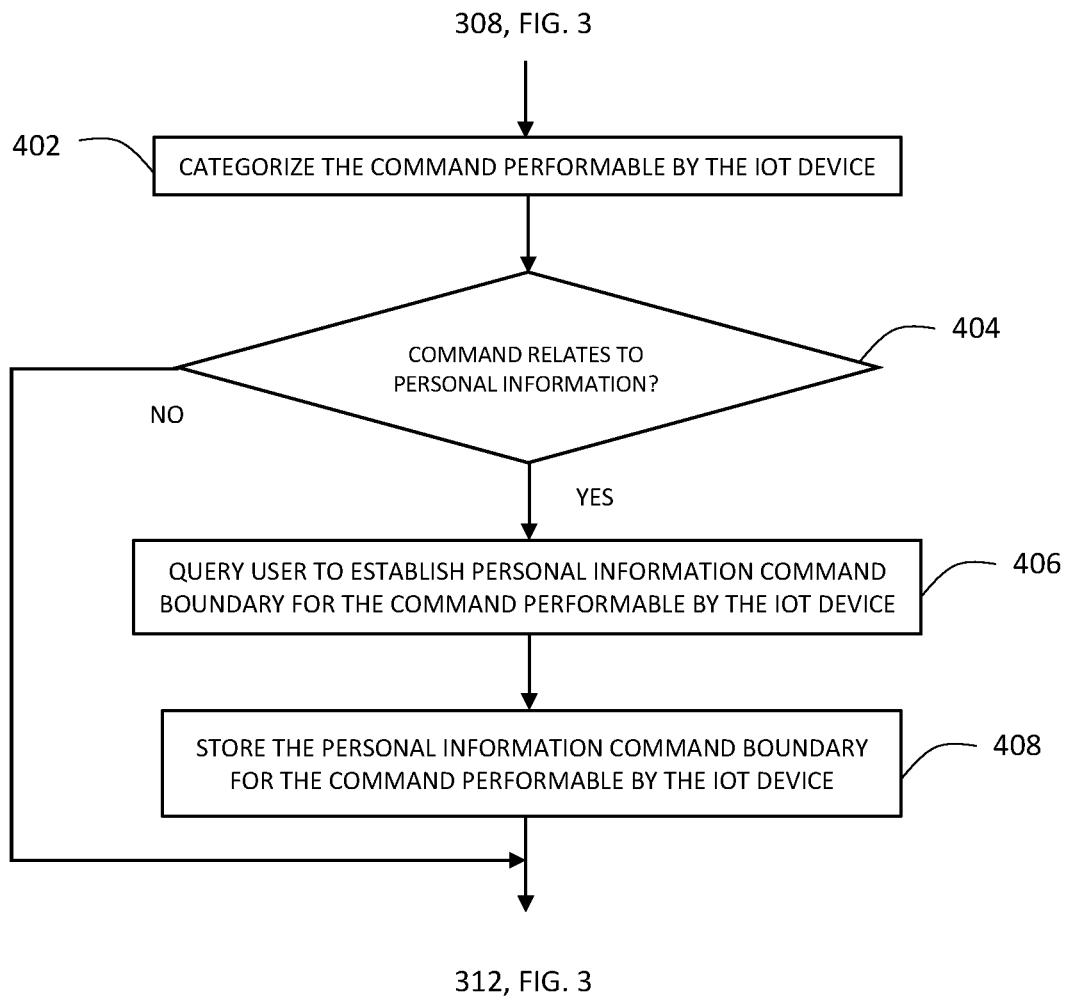
FIG. 4 depicts a flowchart for a command boundary program analyzing a command for personal information directed to an intelligent virtual assistant, in accordance with an embodiment of the present invention.

FIG. 4 depicts a flowchart for a command boundary program analyzing a command for personal information directed to an intelligent virtual assistant, in accordance with an embodiment of the present invention.

Command boundary program 112 categorizes the command performable by the IoT device (402). Command boundary program 112 can utilize a user feedback based iterative training model to identify and categorize the command performable by the IoT device. Command boundary program 112 categorizes portions of the command as including personal information or not including personal information utilizing natural language processing to identify portions of the command that include personal information. In one example, command boundary program 112 receives a command that states, "AB, please call the credit card company for my card ending in –1234" and categorizes the portion "my card ending in –1234" as including personal information. In another example, command boundary program 112 receives a command that states, "AB, what was the account number utilized for our last shipment from company C?" and categorize no portion of the command as including personal information. Even though the command includes the words "account number", no "number" is included in the command. Command boundary program 112 also categorizes the command performable by the IoT device as including personal information or resulting in an audible response with personal information. From the previous example where command boundary program 112 receives a command that states, "AB, please call the credit card company for my card ending in –1234", command boundary program 112 categorizes the command as a command performable by the IoT device that includes personal information. From the previous example where command boundary program 112 receives a command that states, "AB, what was the account number utilized for our last shipment from company C?", command boundary program 112 categorizes the command as a command resulting in an audible response with personal information.

Command boundary program 112 determines whether the command relates to personal information (decision 404). The command relates to personal information if at least a portion of the command is categorized as having personal information and if the command results in an audible response with personal information. In the event command boundary program 112 determines the command relates to personal information ("yes" branch, decision 404), command boundary program 112 queries the user to establish personal information command boundary for the command performable by the IoT device (406). In the event command boundary program 112 determines the command does not relate to personal information ("no" branch, decision 404), command boundary program 112 proceeds to identify a distance for the audio source relative to each of the multiple IoT devices (312, FIG. 3B).

Command boundary program 112 queries the user to establish personal information command boundary for the command performable by the IoT device (406). In this embodiment, command boundary program 112 queries an administrative user to establish the personal information command boundary associated with a specific volume level when responding to the command relating to personal information, where the specific volume level is lower than an operational volume level previously established by the user. Command boundary program 112 receives the personal information command boundary from the user similar to how command boundary program 112 establishes an operational command boundary for each of the multiple devices in (304) in FIG. 3. A radius for the personal information command boundary is less than a radius for the operational command boundary for the IoT device. If command boundary program 112 does not receive the personal information command boundary from the user or command boundary program 112 determine the radius received for the personal information command boundary is above a pre-determined level, command boundary program 112 sends an additional notification warning of potential security issues with a radius above the pre-determined level for the personal information command boundary.

Command boundary program 112 stores the personal information command boundary for the command performable by the IoT device (408). Command boundary program 112 stores the personal information command boundary for the command performable by the IoT device and sends the personal information command boundary as an instruction, along with the command to the appropriate IoT device. The appropriate IoT device utilizes the personal information command boundary when providing an audible response to the command at the specific volume level.

Figure 5:
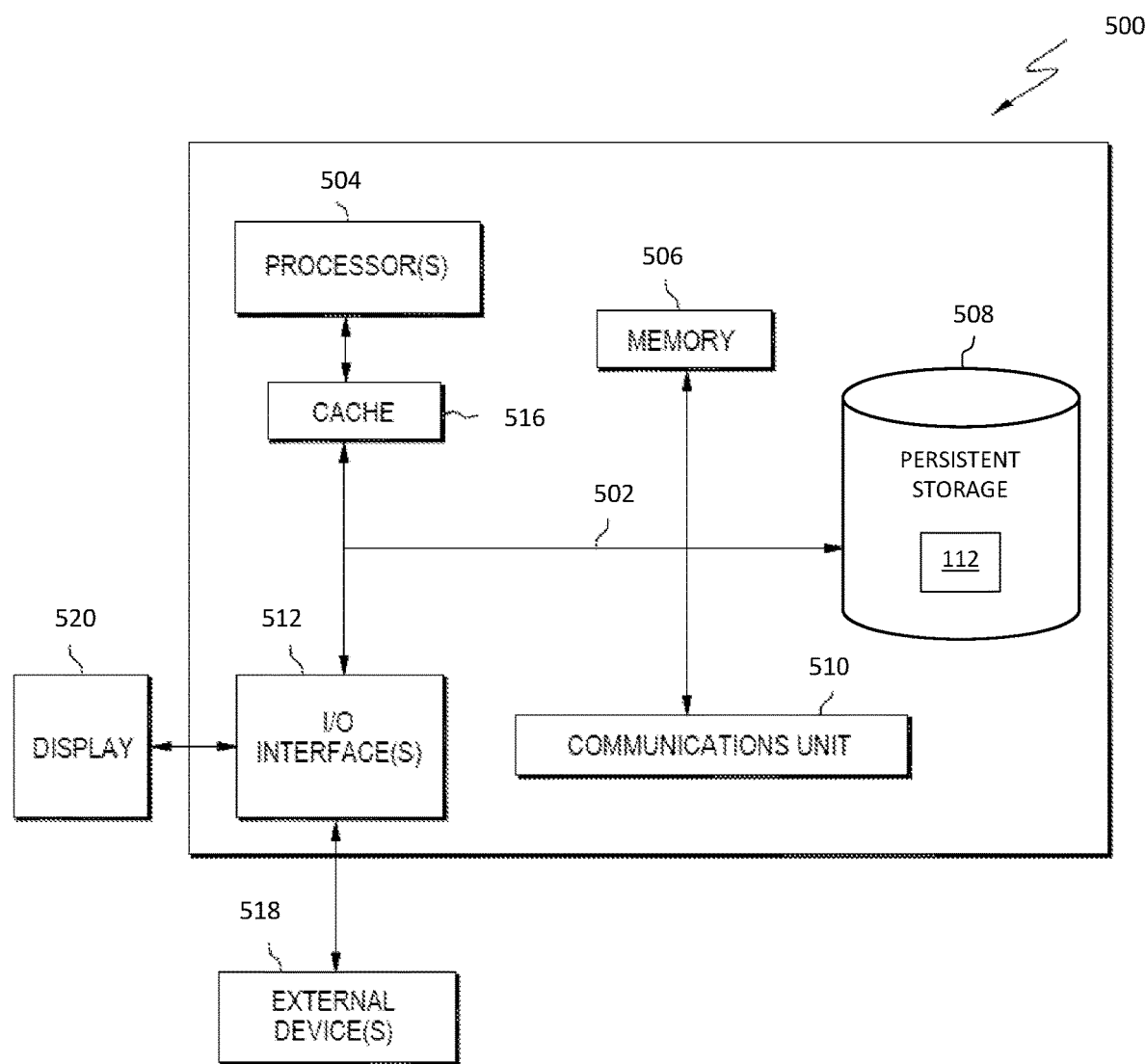
FIG. 5 is a block diagram of components of a computer system, such as the server computer of FIG. 1, in accordance with an embodiment of the present invention.

FIG. 5 depicts computer system 500, where server computer 102 is an example of a computer system 500 that includes command boundary program 112. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
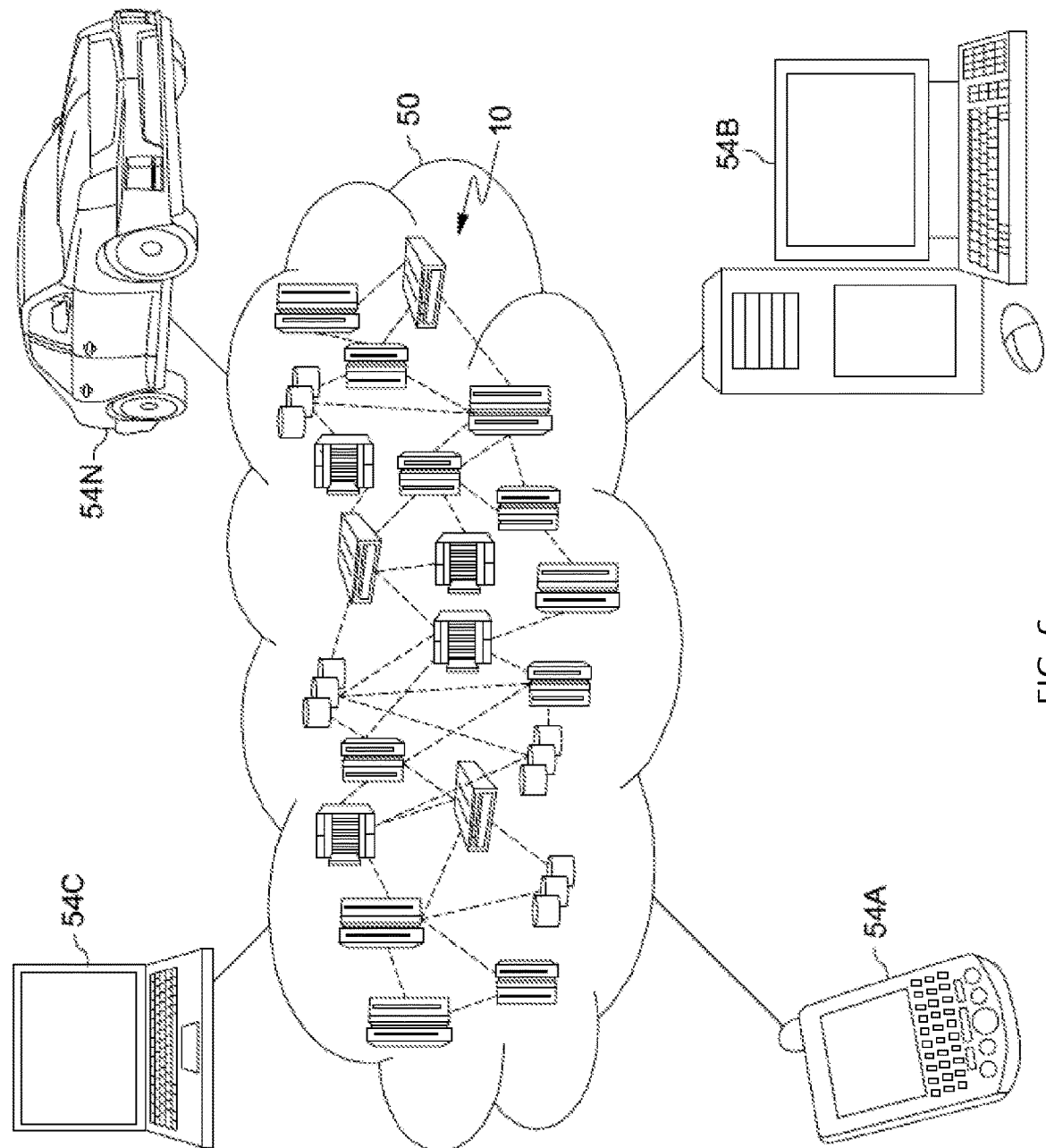
FIG. 6 depicts a cloud computing environment, in accordance with an embodiment of the present invention.
Figure 7:
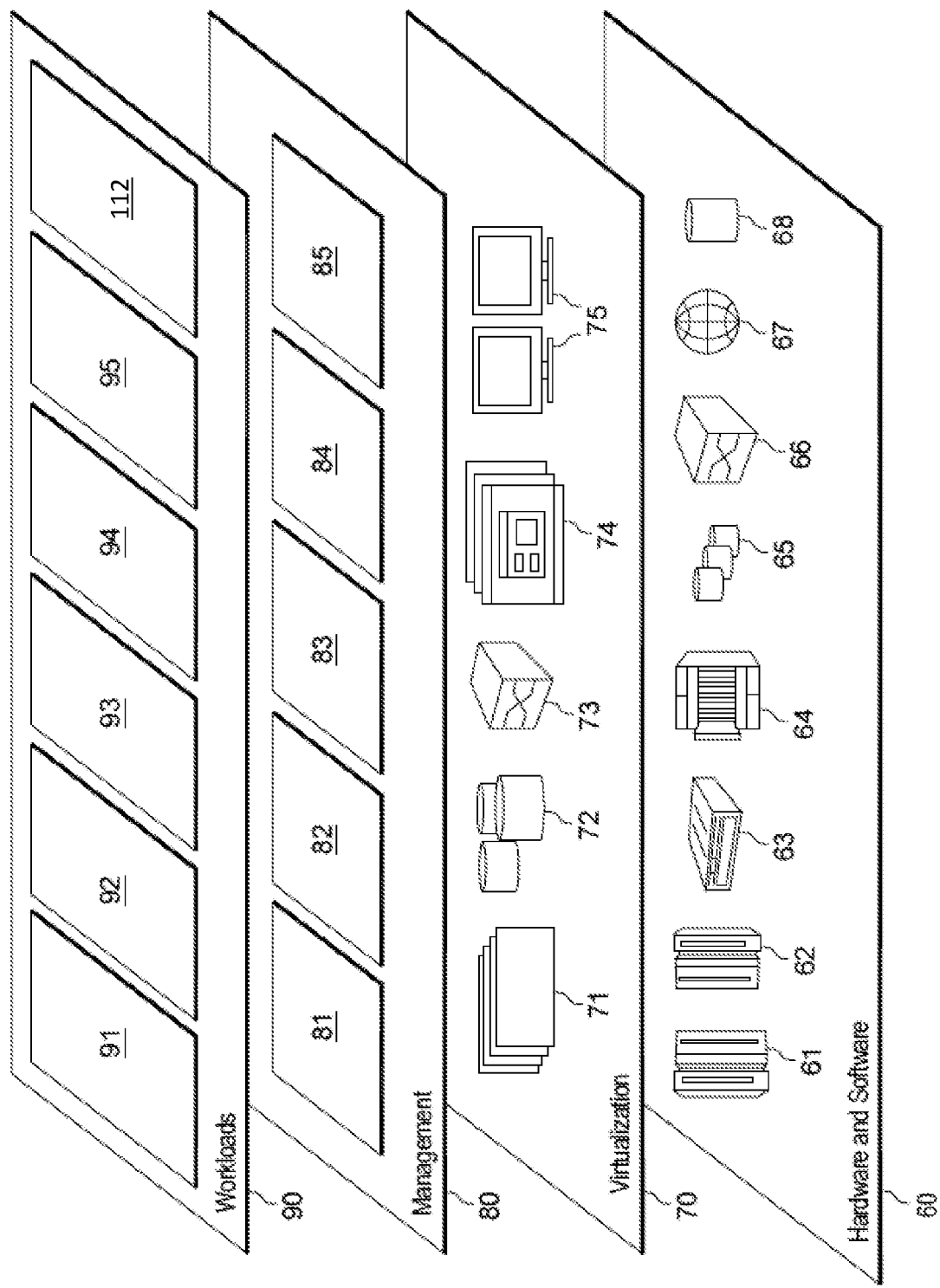
FIG. 7 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command boundary program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   establishing a near field radius for an intelligent virtual assistant operating on a first electronic device, wherein the near field radius is a command boundary that separates near field audio and far field audio; responsive to receiving audio from a plurality of sources within a vicinity of the first electronic device, identifying a portion of the audio from the plurality of sources within the near field radius; and responsive to determining a command is identifiable in the portion of the audio from the plurality of sources within the near field radius, instructing the intelligent virtual assistant to perform the command.

2. The computer-implemented method of claim 1, further comprising:
   analyzing the portion of the audio from the plurality of sources within the near field radius for the command performable by the first electronic device.

3. The computer-implemented method of claim 1, further comprising:
   responsive to determining a second electronic device is associated with the command, displaying the command in the second electronic device; and
   responsive to receiving from the second electronic device a correction to the command; instructing the intelligent virtual assistant to perform the command with the correction.

4. The computer-implemented method of claim 3, wherein a first indicator is assigned to a first sub-command of the command and a second indicator is assigned to a second sub-command of the command.

5. The computer-implemented method of claim 4, further comprising:
   receiving from the second electronic device the correction to the command, wherein the correction assigns the first indicator to the second sub-command of the command and the second indicator to the first sub-command of the command.

6. The computer-implemented method of claim 5, wherein the first indicator instructs the virtual assistant to perform the second sub-command of the command prior to perform the first sub-command of the command with the second indicator.

7. A computer-implemented method comprising:
   establishing a first command boundary for a first intelligent virtual assistant operating on a first electronic device;
   responsive to receiving audio from a plurality of sources within a vicinity of the first electronic device, identifying a portion of the audio from the plurality of sources within the first command boundary; and
   responsive to determining a command is identifiable in the portion of the audio from the plurality of sources within the first command boundary, sending the command to the first intelligent virtual assistant on the first electronic device.

8. The computer-implemented method of claim 7, further comprising:

establishing a second command boundary for a second intelligent virtual assistant operating on a second electronic device, wherein the first command boundary does not overlap the second command boundary.

9. The computer-implemented method of claim 8, further comprising:
establishing a first set of command rules for the first intelligent virtual assistant operating on the first electronic device and a second set of command rules for the second intelligent virtual assistant operating on the second electronic device.

10. The computer-implemented method of claim 9, further comprising:
analyzing the command for personal information;
responsive to determining the command relates to personal information based on the analyzing, sending an instruction to the first intelligent virtual assistant on the first electronic device based on a personal information command boundary for the command.

11. The computer-implemented method of claim 10, wherein analyzing the command for personal information further comprises:
categorizing the command performable by the first intelligent virtual assistant on the first electronic device;
responsive to determining based on the categorization the command relates to personal information, querying a user to establish the personal information command boundary for the command, where a volume level response for the first intelligent virtual assistant on the first electronic device is associated with the personal information command boundary; and
storing the personal information command boundary for the command.

12. The computer-implemented method of claim 11, wherein categorizing the command performable by the first intelligent virtual assistant on the first electronic device further comprising:
categorizing the command as relating to personal information or a first portion of the command as relating to personal information; and
categorizing the command as including personal information or resulting in an audible response with personal information by the first intelligent virtual assistant on the first electronic device.

13. The computer-implemented method of claim 12, further comprising:
determining the command relates to personal information since the first portion of the command is categorized as having personal information and the command results in the audible response with personal information by the first intelligent virtual assistant on the first electronic device.

14. A computer program product comprising one or more computer readable storage media and program instructions collectively stored on the one or more computer readable storage media, the stored program instructions executable by one or more computer processors, the stored program instructions comprising:
program instructions to establish a first command boundary for a first intelligent virtual assistant operating on a first electronic device;
program instructions to, responsive to receiving audio from a plurality of sources within a vicinity of the first electronic device, identify a portion of the audio from the plurality of sources within the first command boundary; and
program instructions to, responsive to determining a command is identifiable in the portion of the audio from the plurality of sources within the first command boundary, send the command to the first intelligent virtual assistant on the first electronic device;

Tian (US 2018/0047394) teaches systems and methods for associating audio signals in an environment surrounding a voice-controlled system include receiving by a voice-controlled system through a microphone, an audio signal from a user of a plurality of users within an environment surrounding the microphone; The voice-controlled system determines a source location of the audio signal; The voice-controlled system determines a first user location of a first user and a second user location of a second user; The voice-controlled system then determines that the first user location correlates with the source location such that the source location and the first user location are within a predetermined distance of each other; In response, the voice-controlled system performs at least one security action associated with the first user providing the audio signal.

15. The computer program product of claim 14, the stored program instructions further comprising:
program instructions to establish a second command boundary for a second intelligent virtual assistant operating on a second electronic device, wherein the first command boundary does not overlap the second command boundary.

16. The computer program product of claim 14, the stored program instructions further comprising:
program instructions to establish a first set of command rules for the first intelligent virtual assistant operating on the first electronic device and a second set of command rules for the second intelligent virtual assistant operating on the second electronic device.

17. The computer program product of claim 16, the stored program instructions further comprising:
program instructions to analyze the command for personal information;
program instructions to, responsive to determining the command relates to personal information based on the analyzing, send an instruction to the first intelligent virtual assistant on the first electronic device based on a personal information command boundary for the command.

18. The computer program product of claim 17, wherein program instructions to analyze the command for personal information, further comprises:
program instructions to categorize the command performable by the first intelligent virtual assistant on the first electronic device;
program instructions to, responsive to determining based on the categorization the command relates to personal information, query a user to establish the personal information command boundary for the command, where a volume level response for the first intelligent virtual assistant on the first electronic device is associated with the personal information command boundary; and
program instructions to store the personal information command boundary for the command.

19. The computer program product of claim 18, wherein program instruction to categorize the command performable by the first intelligent virtual assistant on the first electronic device, further comprises:

program instructions to categorize the command as relating to personal information or a first portion of the command as relating to personal information; and program instructions to categorize the command as including personal information or resulting in an audible response with personal information by the first intelligent virtual assistant on the first electronic device.

20. The computer program product of claim 19, the stored program instructions further comprising:

program instructions to determine the command relates to personal information since the first portion of the command is categorized as having personal information and the command results in the audible response with personal information by the first intelligent virtual assistant on the first electronic device.

21. A computer system comprising:

one or more computer processors;

one or more computer readable storage media; and program instructions stored on the computer readable storage media for execution by at least one of the one or more computer processors, the program instructions comprising:

program instructions to establish a first command boundary for a first intelligent virtual assistant operating on a first electronic device;

program instructions to, responsive to receiving audio from a plurality of sources within a vicinity of the first electronic device, identify a portion of the audio from the plurality of sources within the first command boundary; and program instructions to, responsive to determining a command is identifiable in the portion of the audio from the plurality of sources within the first command boundary, send the command to the first intelligent virtual assistant on the first electronic device.

22. The computer system of claim 21, the stored program instructions further comprising:

program instructions to establish a second command boundary for a second intelligent virtual assistant operating on a second electronic device, wherein the first command boundary does not overlap the second command boundary.

23. The computer system of claim 21, the stored program instructions further comprising:

program instructions to establish a first set of command rules for the first intelligent virtual assistant operating on the first electronic device and a second set of command rules for the second intelligent virtual assistant operating on the second electronic device.

24. The computer system of claim 23, the stored program instructions further comprising:

program instructions to analyze the command for personal information;

program instructions to, responsive to determining the command relates to personal information based on the analyzing, send an instruction to the first intelligent virtual assistant on the first electronic device based on a personal information command boundary for the command.

25. The computer system of claim 24, wherein the program instructions to analyze the command for personal information, the stored program instructions further comprises:

program instructions to categorize the command performable by the first intelligent virtual assistant on the first electronic device;

program instructions to, responsive to determining based on the categorization the command relates to personal information, query a user to establish the personal information command boundary for the command, where a volume level response for the first intelligent virtual assistant on the first electronic device is associated with the personal information command boundary; and program instructions to store the personal information command boundary for the command.

\* \* \* \* \*